United States Patent [19]

Satterwhite

[11] 4,101,019
[45] Jul. 18, 1978

[54] AERIAL CONVEYOR SYSTEM

[76] Inventor: Charles R. Satterwhite, 15920 Coolwood, Dallas, Tex. 75218

[21] Appl. No.: 620,929

[22] Filed: Oct. 9, 1975

Related U.S. Application Data

[63] Continuation of Ser. No. 413,537, Nov. 7, 1973, abandoned.

[51] Int. Cl.$^2$ .............................................. B65G 63/00
[52] U.S. Cl. ..................................... 198/300; 198/304; 198/813; 198/862; 104/123
[58] Field of Search ................... 198/208, 88, 89, 117, 198/36, 102, 137, 192, 828, 813, 812, 300, 862, 860, 864, 304; 214/10; 37/192; 104/123

[56] References Cited

U.S. PATENT DOCUMENTS

| 2,179,187 | 11/1939 | Kendall | 198/36 |
| 2,371,747 | 3/1945 | Faris et al. | 198/137 |
| 2,862,607 | 12/1958 | Stamos et al. | 198/192 |
| 2,897,564 | 8/1959 | Hardy | 198/813 |
| 3,587,825 | 6/1971 | Smith | 198/36 |
| 3,887,061 | 6/1975 | Hopkins | 198/36 |

FOREIGN PATENT DOCUMENTS

| 256,574 | 1/1965 | Australia | 198/828 |
| 409,612 | 2/1925 | Fed. Rep. of Germany | 37/192 |
| 449,847 | 9/1927 | Fed. Rep. of Germany | 198/102 |
| 543,454 | 2/1932 | Fed. Rep. of Germany | 37/192 |
| 664,260 | 8/1938 | Fed. Rep. of Germany | 37/192 |
| 667,084 | 11/1938 | Fed. Rep. of Germany | 37/192 |
| 1,130,355 | 6/1958 | Fed. Rep. of Germany | 198/813 |
| 2,411,981 | 3/1974 | Fed. Rep. of Germany | 198/828 |
| 6,708,949 | 1/1968 | Netherlands | 198/828 |

Primary Examiner—Drayton E. Hoffman
Assistant Examiner—Carl Rowold
Attorney, Agent, or Firm—Richards, Harris & Medlock

[57] ABSTRACT

An aerial conveyor system comprises a pair of spaced apart cables extending from a first vehicle including material delivery apparatus across a material receiving zone, across an open area, and across a material discharge zone to a second vehicle. The cables support a plurality of conveyor support frames each comprising a pair of tubular members extending substantially parallel to the cables, a plurality of hook rollers for supporting the tubular members on the cables, and a plurality of transversely disposed conveyor support rollers. An endless conveyor belt is mounted for movement around a course defined by the conveyor support rollers of the conveyor support frames and functions to transport material received from the delivery apparatus of the first vehicle in the receiving zone across the open area to the discharge zone. The conveyor is driven by apparatus including a drive roller mounted at the discharge zone end of the conveyor support frame which is actuated by hydraulic fluid supplied through the tubular elongate members thereof.

In the use of the aerial conveyor system, overburden is preferably removed in accordance with a series of vertically stacked zones. The aerial conveyor system is then employed to discharge the excavated material into a previously mined portion of the excavation in accordance with the same vertical sequence. By this means the original vertical configuration of the excavation is restored, thereby facilitating return of the mined area to productive usage.

37 Claims, 9 Drawing Figures

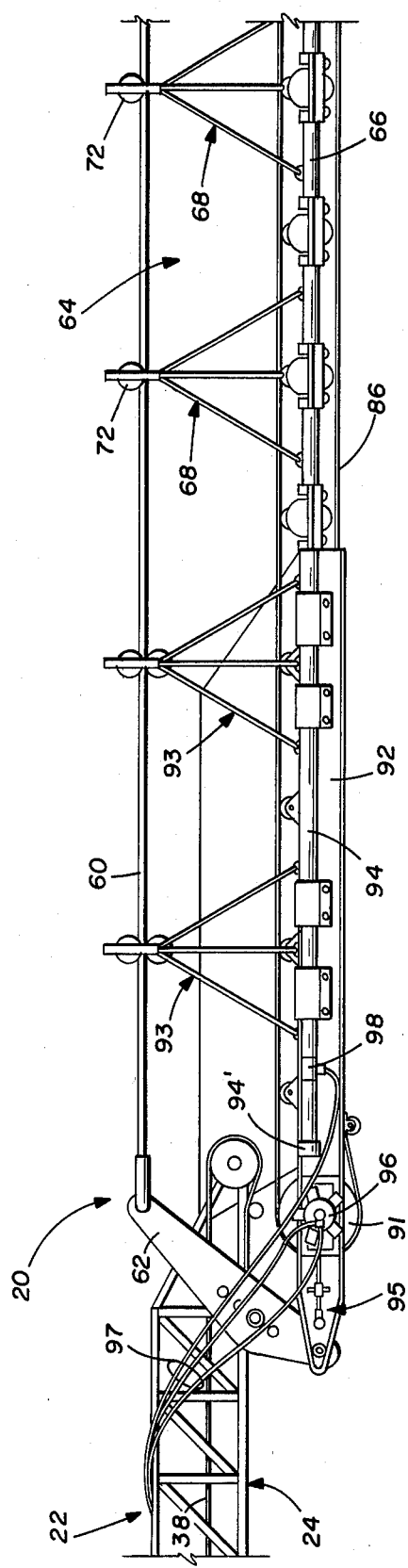
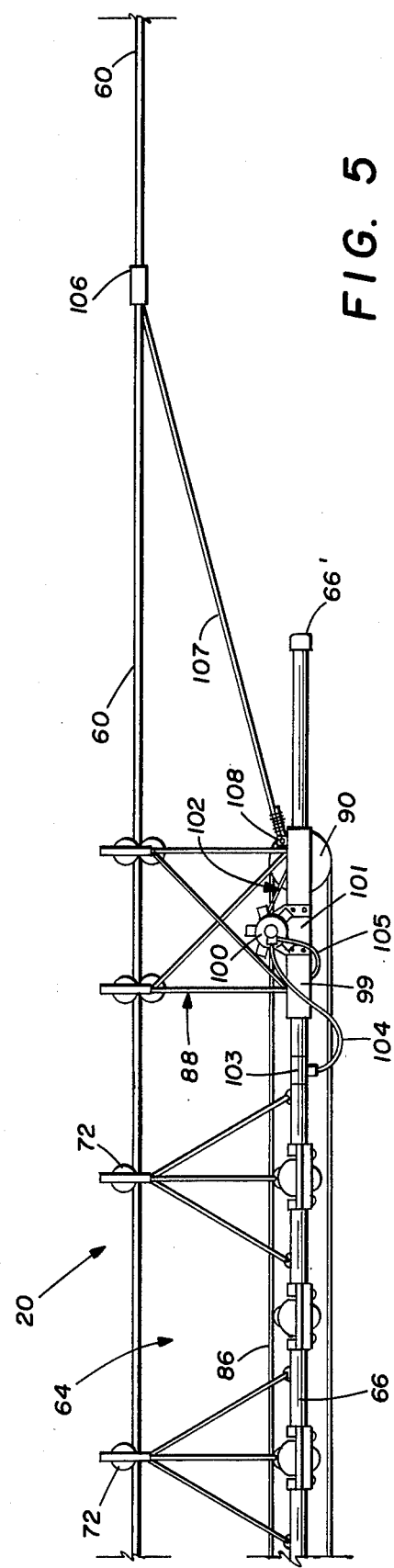

AERIAL CONVEYOR SYSTEM

This is a continuation of application Ser. No. 413,537 filed Nov. 7, 1973, now abandoned.

BACKGROUND AND SUMMARY OF THE INVENTION

This invention relates to an aerial conveyor system, and particularly to an aerial conveyor system that is especially useful in conjunction with strip mining operations.

Strip mining is carried out by removing a layer of material, commonly referred to as "overburden", in order to expose an ore-bearing layer. The ore-bearing layer is then removed using one or more of several conventional techniques depending upon the particular mining operation. Following the mining operation, the excavation may either be refilled or allowed to fill with water.

Although generally more economical then subsurface mining operations, the strip mining procedures in use at the present time typically involve a number of highly disadvantageous characteristics. First, it will be appreciated that in those instances in which the ore-bearing layer to be mined extends over a substantial distance, it is at least theoretically possible to utilize overburden removed from a particular area to refill a previously mined area of the excavation. This possibility has heretofore not been fully utilized in view of the fact that the equipment available to carry out the operation has been less than wholly satisfactory.

For example, systems for refilling strip mining excavations have been constructed using conveyors. However, the conveyors presently available for use in these systems comprise apparatus extending first down one side of the excavation, then along the bottom, and then up the other side. Such equipment is unsatisfactory both because it is unduly expensive and because it is unduly cumbersome to reposition as the excavation of the mine continues.

It is also possible to utilize dump trucks or similar vehicles to convey the newly excavated overburden material to the refilling location. However, this too has proved both unduly costly and cumbersome due to traffic problems which are encountered when a large number of dump trucks are employed in a mining location.

An even more important consideration in the refilling of a strip mining excavation is based on ecological factors. Regardless of whether conveyors or dump trucks are utilized to transport the excavated overburden material to the refilling location, it is presently necessary to refill the previously mined portion of the excavation in substantially reverse order from that in which the overburden material is removed. This means that the topsoil layer is deposited on the bottom of the excavation, followed by the next adjacent subsoil layer, etc. In many instances the net result of this procedure is that the material comprising the surface of the refilled area is not of a type which is capable of sustaining trees and grass, crops, or other vegetation. There is thus produced a substantial desert which is of no practical value.

The present invention comprises an aerial conveyor system which is useful in strip mining operations to eliminate the foregoing and other problems long associated with the prior art. In accordance with the broader aspects of the invention, an aerial conveyor is suspended between two vehicles located on the opposite sides of a strip mining excavation. The first vehicle is positioned adjacent the site at which overburden is being removed from the excavation, and includes apparatus for delivering excavated material to the conveyor. The second vehicle is utilized to position the discharge end of the conveyor over a previously mined portion of the excavation.

The use of the invention is advantageous from a number of standpoints. First, by means of the invention there is provided a system for transporting excavated overburden to a refilling location which does not involve the expense and repositioning difficulties of prior conveyor systems and which simultaneously eliminates the expense and traffic problems of which are encountered when dump trucks are utilized to perform this function. Second, by means of the invention the overall costs of a strip mining operation is substantially reduced. Finally, by means of the invention it is possible to refill the excavation in exactly the same order in which the overburden was removed therefrom. That is, the refilled portion of the excavation is characterized by having topsoil at the upper surface thereof, whereby the process of returning the mined area to productive usage is greatly facilitated.

In accordance with the broader structural aspects of the invention, the aerial conveyor system comprises at least one cable suspended between the two vehicles. A substantially rigid conveyor support structure is supported by the cable and extends from a receiving zone adjacent the first vehicle across an open area of the excavation to a discharge zone. A plurality of spaced apart, substantially transversely disposed conveyor support rollers are mounted on the support structure, and an endless conveyor belt is mounted for movement around a course defined by the conveyor support rollers. The conveyor belt functions to transport material received in the receiving zone from the delivery means of the first vehicle across the open area of the excavation and to discharge the material in the discharge zone.

In accordance with more specific aspects of the invention, the conveyor support structure comprises a plurality of conveyor support frames each including a plurality of hook rollers engaging one of the cables and a pair of elongate members supported by the hook rollers and extending substantially parallel to the cables. The conveyor support frames are mounted end to end, and the elongate members of the conveyor support frames are interconnected to define an array of conveyor support frames which is substantially rigid and which extends from the receiving zone across the open area to the discharge zone. The conveyor support frame at the discharge zone end of the array supports a drive roller and a drive motor which actuates the drive roller to move the conveyor belt around the course. In accordance with one embodiment of the invention, operating power for the drive motor is supplied from the receiving zone end of the array of conveyor support frames through tubular passageways extending through the elongate members thereof.

In accordance with still other aspects of the invention, the conveyor support frame at the discharge end of the array is secure against relative movement with respect to the cable. The receiving zone end of the conveyor system is secured to the first vehicle by means of a bogie comprising levers having upper and lower ends. The levers are pivotally supported on the first vehicle at a point intermediate the upper and lower ends, and the cables and the receiving zone ends of the array of conveyor support frames are secured to the upper and lower ends of the levers, respectively. By this means the bogie functions to vary the tension on the conveyor belt in accordance with the total weight of material being transported by the conveyor system.

DESCRIPTION OF THE DRAWINGS

A more complete understanding of the invention may be had by referring to the following Detailed Description when taken in conjunction with the accompanying Drawings, wherein:

FIG. 4 is a detailed view of the receiving end of the conveyor system;

FIG. 5 is a detailed view of the discharge end of the conveyor system;

DETAILED DESCRIPTION

Figure 1A:
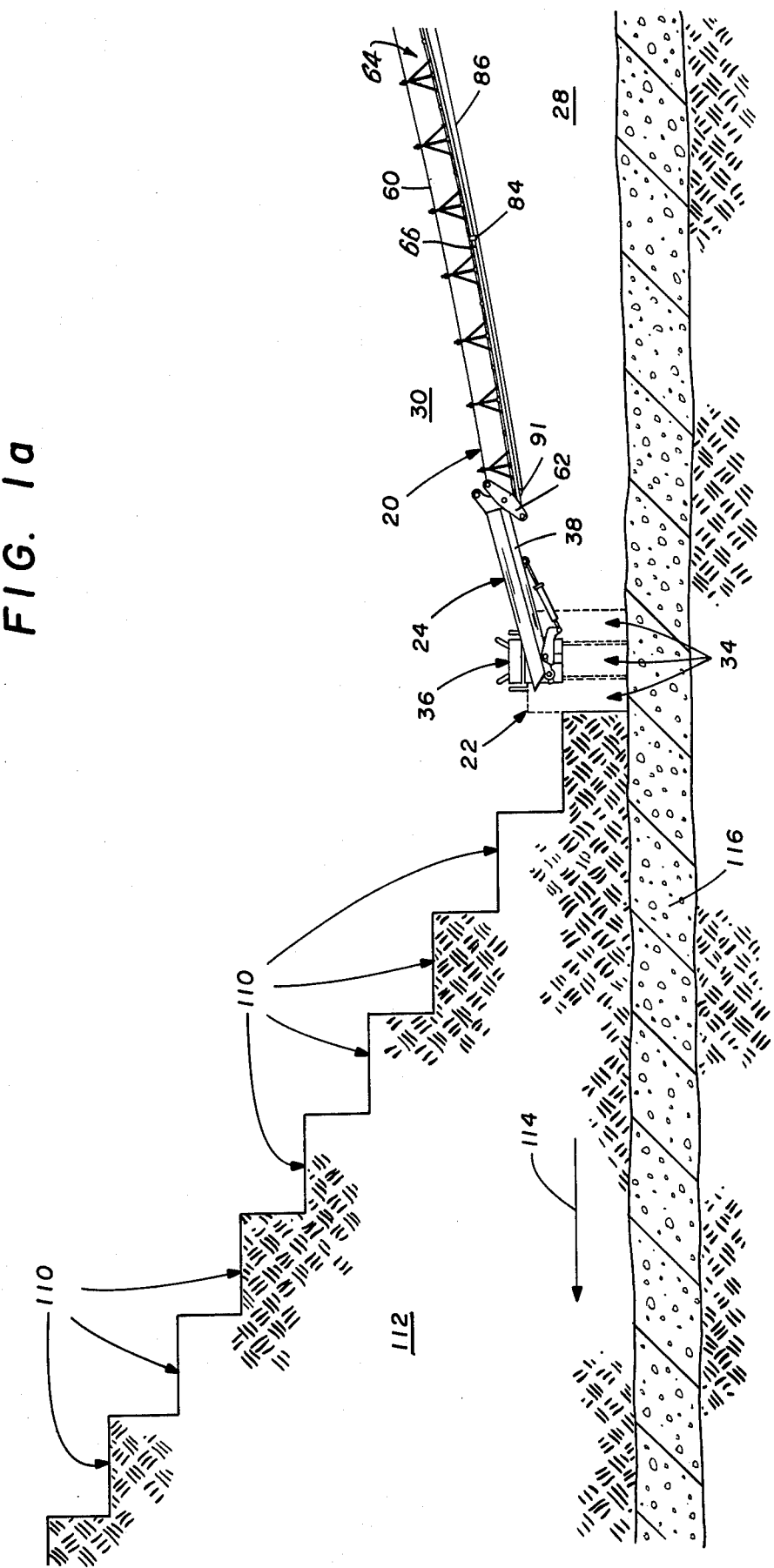
FIGS. 1a and 1b comprise a somewhat diagrammatic illustration of an aerial conveyor system incorporating the invention.
Figure 1B:
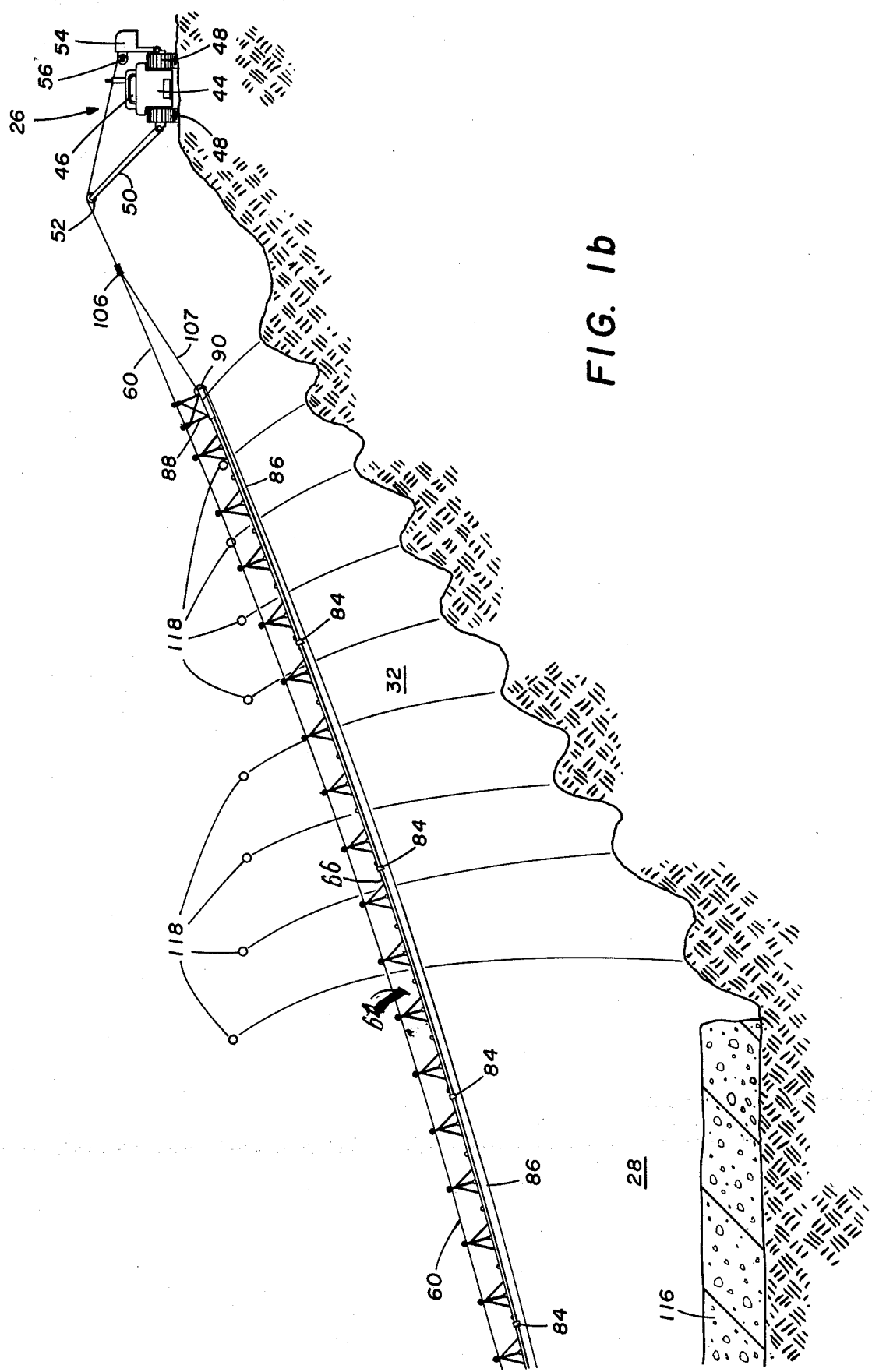

Referring now to the Drawings, and particularly FIGS. 1a and 1b thereof, there is shown an aerial conveyor system 20 incorporating the invention. The aerial conveyor system 20 is supported at one end by a first vehicle 22 including a material delivery apparatus 24 and at the opposite end by a second vehicle 26. The vehicles 22 and 26 are separated by a substantial distance including a substantially open area 28. The function of the aerial conveyor system 20 is to transport material received in a receiving zone 30 from the delivery apparatus 24 of the first vehicle 22 across the open area 28 and to discharge the material in a discharge zone 32.

The vehicle 22 illustrated in FIG. 1a comprises an excavating and loading system of the type disclosed and claimed in the co-pending application of Charles R. Satterwhite, Ser. No. 238,089, filed Mar. 27, 1972, the disclosure of which is incorporated herein by reference. Such a vehicle comprises a plurality of excavating wheels 34 which function to excavate material and to discharge the excavated material onto a main conveyor 36. The main conveyor 36 in turn discharges the material onto a stinger conveyor 38 which comprises the material delivery system 24 of the vehicle 20.

The vehicle 26 comprises a deadman, and may be constructed in accordance with any of the conventional designs for such vehicles. The particular vehicle illustrated in FIG. 1b comprises a frame 44 which supports an engine 46, and a pair of tracks 48 which are actuated by the engine 46 to propel the vehicle. A boom 50 is supported on one side of the vehicle and extends to a pair of idler rollers 52. A counterweight 54 is mounted on the opposite side of the vehicle and supports a pair of constant tension winches 56.

The aerial conveyor system 20 includes a pair of spaced apart cables 60 which extend between the vehicles 22 and 26. The cables 60 are secured at one end to a bogie 62 which is pivotally supported on the discharge end of the material delivery system 24 of the vehicle 22. The opposite ends of the cables are secured to the constant tension winches 56 of the vehicle 26. By this means a predetermined tension is continuously maintained in the cables 60 regardless of the manipulation of one or both of the vehicles 22 and 26 to increase or decrease the distance therebetween.

Figure 2:
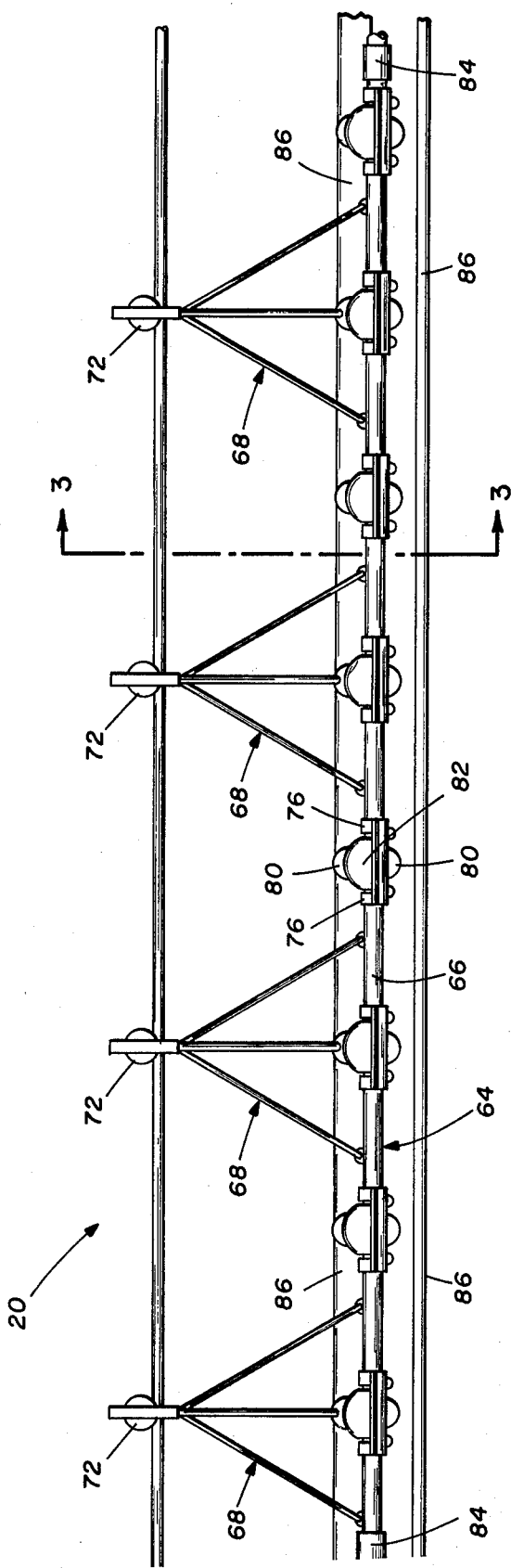
FIG. 2 is a side view of a portion of the conveyor system illustrated in FIGS. 1a and 1b.
Figure 3:
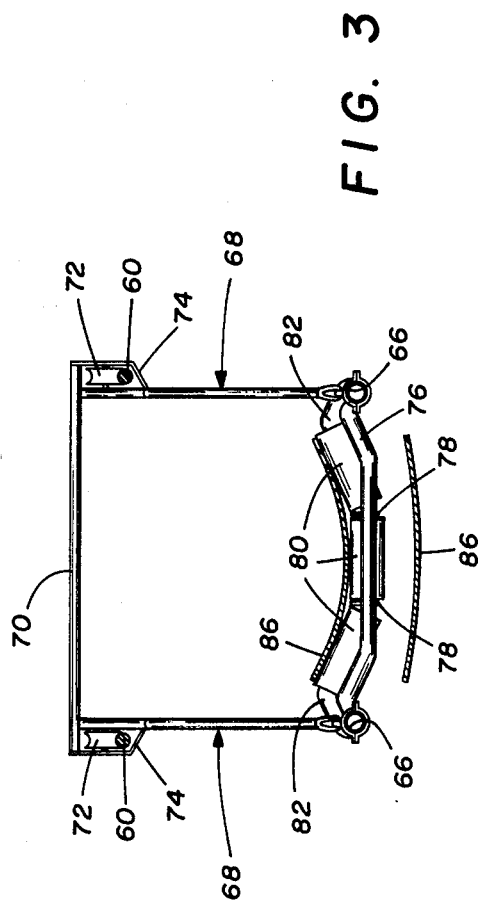
FIG. 3 is a sectional view taken along the line 3—3 in FIG. 2 in the direction of the arrows.

Referring now to FIGS. 2 and 3, the aerial conveyor system 20 further comprises a plurality of conveyor support frames 64 which are supported by the cables 60. Each conveyor support frame 64 comprises a pair of tubes 66 extending below and substantially parallel to the cables 60. A series of frame members 68 extend upwardly from each tube 66, and the frame members on the opposite sides of the aerial conveyor systems 20 are interconnected by bars 70. A hook roller 72 is mounted on each frame member 68 for engagement with the adjacent cable 60. Guard members 74 are provided for preventing disengagement of the cables 60 from the conveyor support frame 64 when the aerial conveyor system 20 is not in use, i.e., when the system is resting on a surface.

The tubes 66 of each conveyor support frame 64 are further interconnected by a series of beams 76 extending therebetween. A plurality of brackets 78 are mounted on the beam 76 and function to rotatably support a plurality of conveyor support rollers 80. The rollers 80 are further supported by brackets 82 mounted on the tubes 66.

Referring again to FIGS. 1a and 1b, the aerial conveyor system 20 comprises a plurality of conveyor support frames 64 supported end to end on the cables 60 and defining an array of support frames extending continuously from the material receiving zone 30 across the open area 28 to the material discharge zone 32. The ends of the tubes 66 of each frame are connected to the ends of the tubes of the adjacent frames by couplings 84. A conveyor belt 86 is mounted on the conveyor support frames and is actuated to transport material received from the delivery apparatus 24 of the vehicle 22 in the receiving zone 30 across the open area 28 and to discharge the material in the discharge zone 32. The array of conveyor support frames 64 extends to a frame 88 mounted at the discharge zone end of the array and fixedly secured to the cables 60. The frame 88 supports a drive roller 90 and a drive motor (not shown in FIG. 1b) which actuates the drive roller 90 to move the conveyor belt 86 around the conveyor course.

In accordance with the preferred embodiment of the invention, the drive motor mounted on the frame 88 comprises a hydraulic motor. Hydraulic fluid for actuating the drive motor is supplied from the vehicle 22 and is directed to the drive motor through the tubes 66 of the conveyor support frames 64 which extend along one side of the aerial conveyor system 20. Spent hydraulic fluid is returned from the motor to the vehicle 22 by means of the tubes 66 extending along the opposite side of the aerial conveyor system 20. By this means the tubes 66 serve not only as structural members for supporting the conveyor belt 86, but also as conduits for supplying operating power to the drive motor which actuates the conveyor. A further advantage to this construction relates to the fact that the presence of pressurized hydraulic fluid within the tubes 66 adds substantially to the strength and rigidity thereof.

Referring now to FIG. 1a, the aerial conveyor system 20 further comprises a roller 91 which defines the receiving zone end of the conveyor course. The roller 91 may comprise a driven roller or an idler roller in accordance with particular requirements. The bogie 62 comprises a pair of levers pivotally supported on the material delivery apparatus 24 of the vehicle 22. The cables 60 are attached to the upper end of the bogie 62, and the receiving zone ends of the tubes 66 of the conveyor support frames 64 are attached to the bottom end of the bogie 62. The point of pivotal connection of the bogie 62 to the material delivery apparatus 24 is adjustable so as to vary the mechanical advantage of the bogie.

The use of the bogie 62 to connect the aerial conveyor system 20 to the first vehicle 22 comprises a very important feature of the present invention. Thus, it will be understood that in order to transport substantial quantities of material by means of the conveyor belt 86, it is necessary to maintain substantial tension in the belt in order to prevent slippage. On the other hand, when the conveyor belt 86 is either unloaded or very lightly loaded, excessive tension in the belt would tend to cause bending of and/or other possible damage to the conveyor support frames 64.

Both of these problems are eliminated by means of the bogie 62. Thus, whenever the total weight of the material being carried by the conveyor belt 86 is increased, this weight is applied directly to the cables 60. Increased weight on the cables 60 tends to pivot the bogie 62 clockwise (FIG. 1a) thereby moving the lower end of the bogie 62 towards the first vehicle 22. As has been indicated, the frame 88 and the drive roller 90 carried thereby are fixedly mounted on the cable 60. However, the roller 91 is carried by the conveyor support frame at the receiving zone end of the aerial conveyor system 20. It will therefore be understood that an increase in the total weight supported by the conveyor system is effective by means of the bogie 62 to increase the distance between the rollers 90 and 91, thereby increasing the tension on the belt in proportion to the increase in weight carried thereby.

Conversely, whenever the total weight of the material carried by the conveyor belt 86 is reduced, the bogie 62 is pivoted counterclockwise (FIG. 1a). This action moves the roller 91 toward the roller 90, thereby reducing the tension in the conveyor belt 86. It will thus be understood that the bogie 62 functions to regulate the tension of the conveyor belt 86 in accordance with the total weight of material carried by the belt, thereby both providing sufficient tension in the belt during the transportation of substantial quantities of material and relieving tension in the belt when the belt is unloaded or lightly loaded so as to prevent damage to the conveyor support frame 64 due to excessive belt tension. As has been pointed out above, the bogie 62 is adapted for support on the material delivery apparatus at various points so as to regulate the mechanical advantage. By this means the extent of the belt tension change in response to a given change in the weight carried by the conveyor system is adjustable.

The structural details of the receiving zone end and of the discharge zone end of the aerial conveyor system 20 are illustrated in FIGS. 4 and 5, respectively. Referring first to FIG. 4, the receiving zone end of the conveyor system 20 comprises a pair of beams 92 which extend substantially parallel to the belt 86. The beams 92 are supported on the cables 60 by frame members 93 which are substantially similar to the frame members 68 of the conveyor support frames 64. The beams 92 in turn support tubing sections 94 which are coupled to the tubes 66 of the rear support frames 64. The ends of the tubing sections 94 are sealed by caps 94'.

The beams 92 also support apparatus 95 for adjusting the angular relationship of the roller 91 to the belt 86. In embodiments of the invention in which the roller 91 is driven, one or more hydraulic drive motors 96 are supported on the beams 92 and are connected to the roller 91. Pressurized hydraulic fluid is directed to the motor 96 and spent hydraulic fluid is removed therefrom by means of lines 97 extending from the vehicle 22. The lines 97 also extend to the tubing sections 94 and are connected thereto by means of couplings 98.

Referring now to FIG. 5, the frame 88 at the discharge end of the conveyor system 20 is slidably supported on the tubes 66 by means of tubing sections 99. The tubes 66 extend through the tubing sections 99 and are plugged at their distal ends by means of caps 66'. One or more drive motors 100 are supported on the tubes 99 by means of brackets 101 and are operatively connected to the roller 90 by means of chain and sprocket drives 102.

Pressurized hydraulic fluid from the tubes 66 on one side of the conveyor system 20 is directed to the hydraulic motor 100 by means of a coupling 103 and a line 104. Spent hydraulic fluid from the motor 100 is directed to the tubes 66 on the opposite side of the conveyor 20 by means of a line 105 and a suitable coupling (not shown).

The frame 88 is secured against movement with respect to the cables 60 by means of clamps 106 and tie rods 107 connected thereto and extending to brackets 108 secured to the tubing sections 99. The tie rods 107 therefore serve to apply the tension of the cables 60 directly to the tubing sections 99 in order to prevent movement thereof relative to the cables 60. It will be understood, however, that the tubes 66 are free to slide within the tubing sections 99. By this means the bogie 62 is operable to vary the tension of the belt 86 in response to the total weight carried by the conveyor system 20.

In the use of the embodiment of the invention illustrated in FIGS. 1a and 1b, the first vehicle 22 is operated to cut a series of "steps" 110 thereby progressively removing overburden 112 in the direction indicated by the arrow 114. By this means a seam of coal 116 is progressively uncovered in the same direction. Meanwhile, previously uncovered coal in the open area 28 is removed by means of conventional mining techniques.

Throughout the excavation of the overburden 112, material excavated by the vehicle 22 is received by the aerial conveyor system 20 in the receiving zone 30 from the material delivery apparatus 24 of the vehicle 22. The aerial conveyor system 20 functions to transport the material across the open area 28 and to discharge the material in the discharge zone 32. As will be appreciated by those skilled in the art, the vehicles 22 and 26 are manipulated such that the discharge zone 32 comprises a previously mined area of the strip mining excavation. During manipulation of the vehicle 22, the discharge end of the aerial conveyor system 20 is positioned at various points 118, whereby the previous contour of the overburden is restored in stairstep fashion in the manner illustrated in FIG. 1b.

Figure 6:
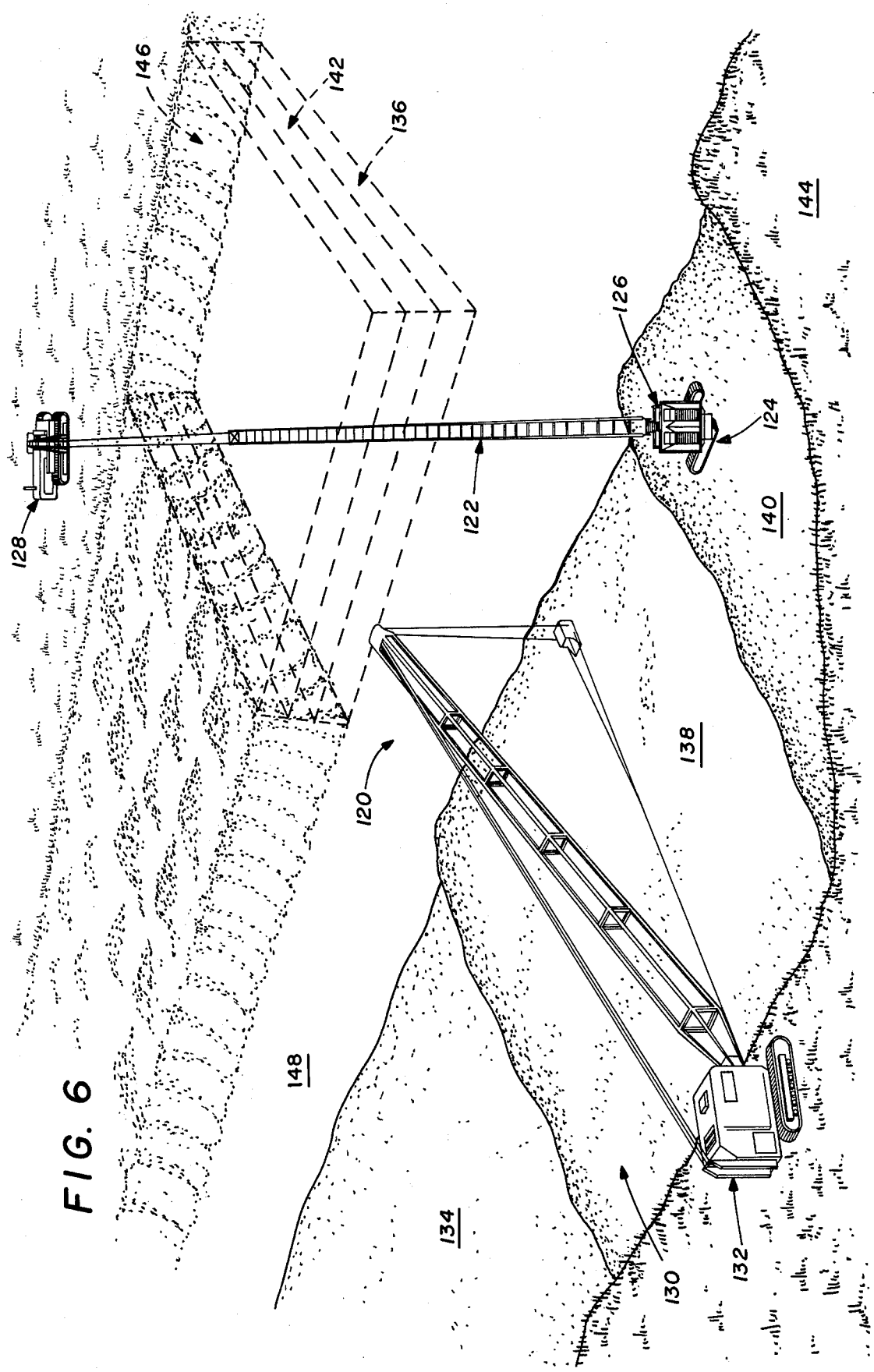
FIG. 6 is a somewhat diagrammatic illustration of a strip mining process incorporating the invention.
Figure 7:
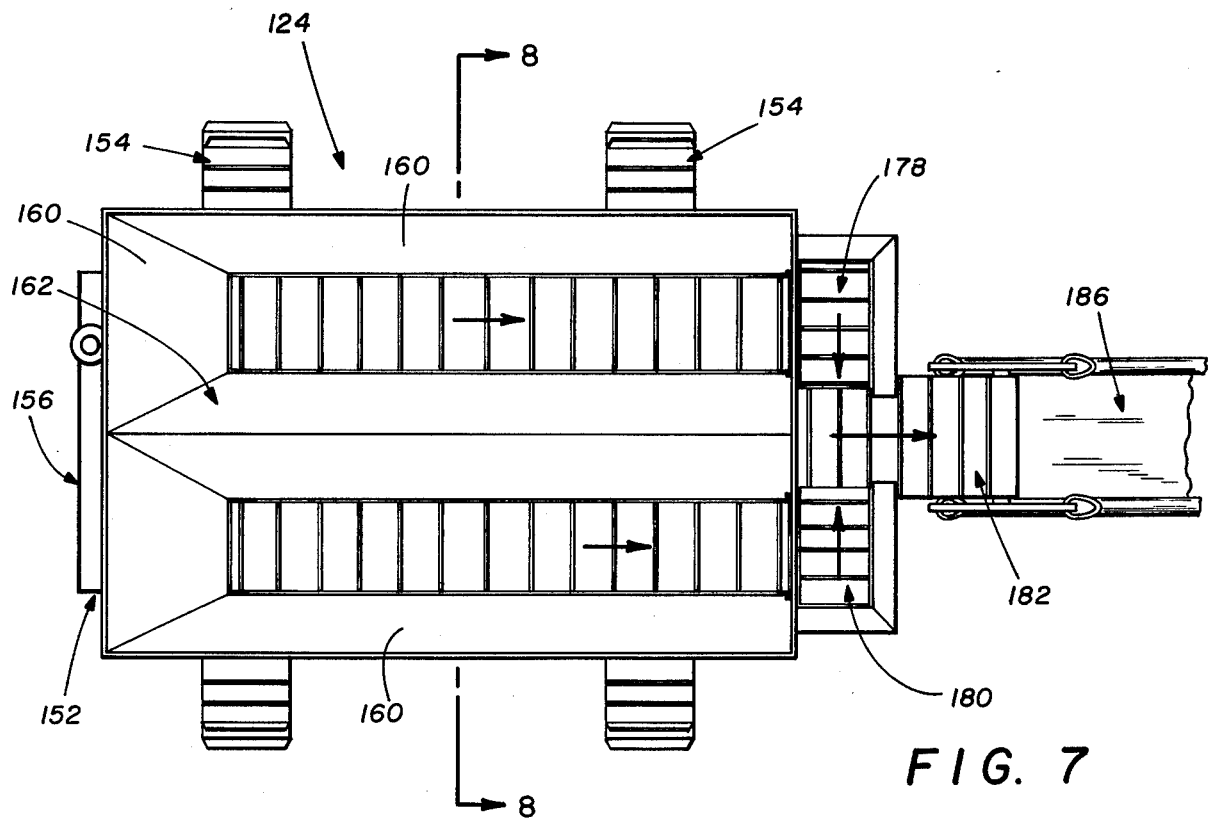
FIG. 7 is a top view of a hopper useful in the process illustrated in FIG. 6.
Figure 8:
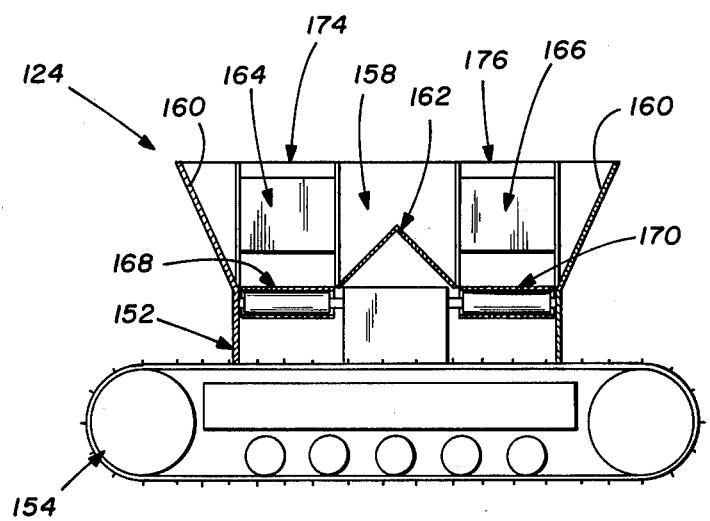
FIG. 8 is a sectional view taken generally along the line 6—6 in FIG. 7 in the direction of the arrows.

Referring now to FIG. 6, there is shown a strip mining process 120 incorporating the invention. The strip mining process 120 utilizes an aerial conveyor system 122 constructed substantially identically to the aerial conveyor system 20 illustrated in FIGS. 1a, 1b, 2 and 3. The aerial conveyor system 122 extends between and is supported by a hopper 124 including a material delivery apparatus 126 and a deadman 128. The deadman 128 may comprise any of the conventional designs for such vehicles.

In the practice of the strip mining process 120, overburden 130 is removed by means of a dragline 132, thereby progressively uncovering a seam of coal or other ore-bearing material 134. As the overburden is excavated, it is delivered by the dragline 132 to the hopper 124, and is in turn delivered from the hopper 124 to the aerial conveyor 122 by means of the material delivery apparatus 126. The aerial conveyor system 122 transports the material across the previously uncovered portion of the ore-bearing material 134 and discharges the material into a previously mined portion of the excavation.

In accordance with the present invention, the dragline 132 and the deadman 128 are operated to refill the previously mined portion of the excavation in such a way as to restore the mined area to productive usage. Thus, during the refilling of the lowermost zone 136 of a previously mined portion of the excavation, the dragline 130 is operated to move material from the lowermost zone 138 of the overburden 130. This material is delivered to the hopper 124, and is in turn delivered to the aerial conveyor system 122 for discharge into the lowermost zone 136 of the previously mined portion of the excavation. After the lowermost zone 136 has been refilled, the dragline 132 is operated to remove overburden from an intermediate zone 140. This material is delivered to the hopper 124 and hence to the aerial conveyor system 122, and is discharged by the aerial conveyor system into a zone 142 of the previously mined portion of the excavation which is positioned just above the lowermost zone 136. After the intermediate zone 142 of the previously mined portion of the excavation has been refilled, the dragline 132 is actuated to remove the topsoil zone 144 of the overburden 130. This material is deposited in the hopper 124 and is discharged by the aerial conveyor system 122 into the uppermost zone 146 of the previously mined area of the excavation.

It will thus be understood that in accordance with the strip mining process 120, a previously mined portion of the excavation is refilled in a series of zones with material removed from the corresponding zone of the overburden. This is highly advantageous in that by means of the process, the mined area is restored to exactly the same vertical configuration that it had prior to the mining operation. This in turn promotes the restoration of the mined area to productive usage, such as replanting of crops, grass and trees, etc. In this regard the fact that the topsoil is returned to the uppermost zone of the previously mined portion of the excavation is of major importance.

In addition to the foregoing, the use of the strip mining process 120 comprising the present invention results in various other advantages over the prior art. Thus, due to the length of the conveyor 122 it is possible to maintain a relatively wide strip 148 between the edge of the seam 134 and the edge of the refilled material. Since the strip 148 comprises part of the previously mined portion of the excavation, it is situated at a lower level than the upper surface of the seam 134. This permits rainwater, etc. to drain from the seam 134 into the strip 148. Assuming that the strip 148 is properly graded, the drainage water then flows into a sump location from which it may be pumped to the surface.

Another advantage deriving from the use of the invention relates to the fact that the relatively wide strip 148 prevents the refilled material from falling onto the surface of the seam 134. Those skilled in the art will appreciate the fact that the edge of the refilled material is often quite steep, and that it is therefore often necessary to shore up this edge, especially during periods of heavy rain. Such shoring operations are completely unnecessary in the practice of the present invention. Still another advantage relates to the fact that in the event a parting layer is encountered in the seam 134, it may be bulldozed into the strip 148, thereby eliminating the necessity of further excavating operations to uncover the remainder of the seam.

Yet another advantage deriving from the use of the invention relates to the fact that a minimum of rehandling of the excavated material is required during the refilling operation. Thus, by manipulating the deadman 128 during operation of the conveyor 122, it is possible to refill each of the zones 136, 142, and 146 by means of a series of relatively small piles. Then, in the event that it is considered desirable to form a relatively flat upper surface on a particular zone before starting the refilling of the next overlying zone, a minimum amount of bulldozing is required in order to complete the leveling operation.

Referring now to FIGS. 5 and 6, the construction and operation of the hopper 124 utilized in the strip mining process shown in FIG. 4 are illustrated in greater detail. The hopper 124 comprises a frame 152 which is supported by a pair of conventional track assemblies 154. An engine 156 is mounted at one end of the frame 152 and functions to supply power for all the operating instrumentalities of the hopper 124.

The hopper 124 comprises an upper material receiving portion 158 defined by generally downwardly and inwardly tapered walls 160. A baffle 162 having an inverted V-shaped cross-section extends the entire length of the material receiving portion 158 of the hopper 124 and serves to divide the lower portion of the material receiving portion into the first and second zones 164 and 166, respectively.

A conveyor 168 defines the bottom of the first zone 164, and a conveyor 170 defines the bottom of the second zone 166. The conveyors 168 and 170 function to transport material out of the material receiving portion 158 of the hopper 124 through a pair of vertically positionable gates 174 and 176, respectively. Material passing through the gates 174 and 176 under the action of the conveyors 168 and 170 is received on a pair of cross conveyors 178 and 180, respectively. The conveyors 178 and 180 deliver the material to a discharge conveyor 182, which in turn delivers the material to a conveyor 184 comprising the aerial conveyor system 122.

In the operation of the hopper 124, the gates 174 and 176 are set at heights corresponding to the maximum size rock that is to be transported on the conveyor 184 of the aerial conveyor system 122. The conveyors 168 and 170 are then operated at normal speed, which is approximately one-half the maximum operating speed of the conveyors. During normal operation, material received in the material receiving portion 158 is transported therefrom under the action of both the conveyor 168 and the conveyor 170 and is delivered to the aerial conveyor system 122 by means of the conveyors 178 and 180 and the conveyor 182.

Assume now that a rock larger than the maximum size rock which can safely be handled by the aerial conveyor system 122 is received in the material receiving portion 158 of the hopper 124. The baffle 162 causes the rock to fall either into the first portion 164 or the second portion 166. Assuming that the rock falls into the second portion 166, the gate 176 prevents the rock from passing onto the cross conveyor 180, and therefore prevents delivery of the rock to the aerial conveyor system 122.

As soon as the presence of a large rock in the second portion 166 of the hopper 124 is noticed, operation of the conveyor 170 is terminated. At the same time the operating speed of the conveyors 168 and 178 is substantially increased so that the same amount of material which was previously transported out of the hopper 124 by the conveyors 168 and 170 and the conveyors 178 and 180 operating in tandum is now transported out of the hopper 124 by means of the conveyors 168 and 178 operating singly.

Following the increase in the operating speed of the conveyors 168 and 178, the direction of operation of the conveyor 180 is reversed. The gate 176 is then opened and the conveyor 170 is actuated to deliver the large rock to the conveyor 180. Since the conveyor 180 is operating in reverse, this action causes the rock to be discharged to one side of the hopper 124 and not onto the aerial conveyor system 122.

Following the foregoing steps, the gate 176 is returned to its original position, the direction of operation of the conveyor 180 is re-reversed, and the operating speeds of the conveyors 168 and 178 are returned to normal. The normal operating parameters of the hopper 124 are retained until another rock too large to be handled by the aerial conveyor system 122 is encountered. At this point in time the foregoing steps are repeated to dispose of the large rock. It will be understood that if the rock should happen to come to rest in the first portion 164, the steps enumerated above regarding the second portion 176 will be carried out on the opposite sides of the hopper 124.

From the foregoing, it will be understood that the use of the present invention results in numerous advantages over the prior art. Thus, by means of the invention overburden excavated to provide access to an ore-bearing layer is utilized in refilling previously mined portions of the excavation. This is accomplished by means of an economical and highly maneuverable aerial conveyor system, thereby eliminating problems encountered both in the use of prior art conveyor systems and in the use of dump trucks or other vehicles for conveying excavated overburden to the refilling location. Perhaps more importantly, by means of the invention the previously mined portion of the excavation is refilled in accordance with the same vertical sequence that is utilized in excavating the overburden. This results in returning topsoil to the uppermost portion of the refilled area, which in turn greatly facilitates the returning of the mined area to productive use.

Although particular embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. An aerial conveyor system comprising:
   a cable extending from a material receiving zone over an open area to a material discharge zone;
   a plurality of conveyor support frames each comprising a pair of elongate members extending substantially parallel to the cable, hook roller means for supporting the elongate members on the cable, and roller means supported by and extending transversely between the elongate members;
   the conveyor support members engaging one another end to end to define a substantially continuous array extending from the receiving zone across the open area to the discharge zone;
   an endless conveyor belt supported on the conveyor support rollers for movement around a course extending from the receiving zone over the open area to the discharge zone;
   drive means mounted at the discharge zone end of the array of support members for driving the conveyor belt around the course;
   said elongate members of the support frames being tubular and having the adjacent ends thereof connected in communication with one another; and
   means extending through the tubular elongate members of the conveyor support frames from the receiving zone end of the array to the discharge zone end for supplying operating power to the drive means.

2. The aerial conveyor system according to claim 1 wherein the drive means is hydraulically operated, and wherein the operating power supplying means comprises means for supplying pressurized hydraulic fluid to the drive means through the tubular elongate members on one side of the conveyor belt and for returning spent hydraulic fluid through the tubular elongate members on the opposite side of the conveyor belt.

3. The aerial conveyor system according to claim 1 further characterized by first and second vehicles connected to and supporting the opposite ends of the cable, whereby both the receiving zone end and the discharge zone end of the conveyor system are independently positionable.

4. An aerial conveyor system comprising:
   a cable extending from a material receiving zone over an open area to a material discharge zone;
   a plurality of conveyor support frames each comprising a pair of elongate members extending substantially parallel to the cable, hook roller means for supporting the elongate members on the cable, and roller means supported by and extending transversely between the elongate members;
   the conveyor support members engaging one another end to end to define a substantially continuous array extending from the receiving zone across the open area to the discharge zone;
   an endless conveyor belt supported on the conveyor support rollers for movement around a course extending from the receiving zone over the open area to the discharge zone;
   drive means mounted at the discharge zone end of the array of support members for driving the conveyor belt around the course;
   means mounted on the conveyor support frames and extending from the receiving zone end of the array to the discharge zone end for supplying operating power to the drive means;
   means securing the discharge zone end of the array of conveyor support frames to the cable to prevent relative movement therebetween;

means securing a portion of the array of conveyor support frames for relative axial movement with respect to the remainder thereof whereby the distance between the receiving zone end and the discharge zone end of the array is variable;

a lever mounted at the receiving zone end and having upper and lower ends;

means pivotally supporting the lever at a point intermediate between the upper and lower ends;

means connecting the cable to the upper end of the lever; and means connecting the receiving zone ends of the elongate members of the conveyor support frames to the lower end of the lever and thereby varying the tension in the conveyor belt in accordance with the weight of material carried by the conveyor system.

5. An aerial conveyor system comprising:

at least one elongate cable extending across a material receiving zone, across an open area comprising a substantial portion of the length of the cable, and across a material discharge zone;

a first vehicle supporting the receiving zone end of the cable and including material delivery means;

a second vehicle supporting the discharge zone end of the cable;

a plurality of substantially rigid conveyor support frames each comprising parallel elongate tubular members extending substantially beneath the cable, a plurality of hook rollers for supporting the elongate tubular members on the cable, and a plurality of substantially transversely disposed conveyor support rollers each rotatably supported on the elongate tubular members;

said elongate tubular members being connected together end to end to form passageways extending continuously from the receiving zone to the discharge zone through the elongate tubular members;

said conveyor support frames engaging one another at the ends to form an array of conveyor support frames extending substantially continuously from the receiving zone across the open area to the delivery zone;

an endless conveyor belt mounted for movement around a course defined by the conveyor support rollers of the conveyor support frames;

means mounted at the discharge zone end of the array for driving the conveyor belt around the course and thereby transporting material from the receiving zone across the open area to the discharge zone; and means extending through at least one of the passageways extending through the elongate tubular members of the conveyor support frames for supplying operating power to the conveyor driving means.

6. The aerial conveyor system according to claim 5 wherein the conveyor driving means is further characterized by a drive roller mounted at the discharge zone end of the array of conveyor support frames and defining the discharge zone end of the course of the conveyor, a drive motor for actuating the drive roller to move the endless conveyor belt around the course, and means extending along the array of conveyor support frames from the receiving zone to the discharge zone for supplying operating power to the drive motor.

7. An aerial conveyor system comprising:

at least one elongate cable extending across a material receiving zone, across an open area comprising a substantial portion of the length of the cable, and across a material discharge zone;

a first vehicle supporting the receiving zone end of the cable and including material delivery means;

a second vehicle supporting the discharge zone end of the cable;

a plurality of substantially rigid conveyor support frames each comprising parallel elongate members extending substantially beneath the cable, a plurality of hook rollers for supporting the elongate members on the cable, and a plurality of substantially transversely disposed conveyor support rollers each rotatably supported on the elongate members;

said conveyor support frames engaging one another at the ends to form an array of conveyor support frames extending substantially continuously from the receiving zone across the open area to the delivery zone;

an endless conveyor belt mounted for movement around a course defined by the conveyor support rollers of the conveyor support frames;

conveyor driving means including a drive roller mounted at the discharge zone end of the array of conveyor support frames and defining the discharge zone end of the course of the conveyor;

a drive motor for actuating the drive roller to move the endless conveyor belt around the course and thereby transporting material from the receiving zone across the open area to the discharge zone;

means extending along the array of conveyor support frames from the receiving zone to the discharge zone for supplying operating power to the drive motor;

a frame member suspended from the cable at the discharge zone end of the array of conveyor support frames for supporting the drive roller and the drive motor and secured against movement relative to the cable;

means supporting the frame member for axial movement relative to the array of conveyor support frames whereby the length of the course of the conveyor is variable;

a roller mounted at the receiving zone end of the array of conveyor support frames for defining the receiving zone end of the course of the endless conveyor belt; and a tensioning device pivotally supported on the first vehicle at a point between its ends and connected at its upper end to the cable and at its lower end to the elongate members of the array of conveyor support frames and thereby functioning to vary the tension in the conveyor belt in accordance with the weight of the material being transported by the conveyor system.

8. The aerial conveyor system according to claim 7 wherein the second vehicle comprises a deadman and includes means for maintaining a predetermined tension in the cable notwithstanding relative movement of the first and second vehicles toward and away from each other.

9. The aerial conveyor system according to claim 8 wherein the first vehicle includes excavating means and material delivery means for receiving material from the excavating means and for delivering the material to the endless conveyor belt.

10. An aerial conveyor system comprising:
a first vehicle situated in an excavation zone and comprising material delivery means;
a second vehicle situated at a point separated from the excavation zone by an open area of substantial size;
a pair of spaced apart, substantially parallel cables both suspended between the first and second vehicles and extending from the first vehicle through a material receiving zone, across the open area, and through a material discharge zone to the second vehicle;
a plurality of conveyor support frames each comprising:
   a plurality of hook rollers engaging the cables at spaced points therealong,
   a pair of spaced apart elongate tubular members suspended from the cables by the hook rollers and extending substantially parallel to the cables,
   a plurality of substantially transversely disposed conveyor support rollers extending between the elongate tubular members and positioned at spaced points lengthwise thereof;
the ends of the elongate tubular members of the conveyor support frames being interconnected to form an array of conveyor support frames extending substantially continuously from the receiving zone across the open area to the discharge zone and to form passageways extending continuously from the receiving zone to the discharge zone through the elongate tubular members;
a drive roller mounted at the discharge zone end of the array of conveyor support frames;
a drive motor mounted at the discharge zone end of the array of conveyor support frames for actuating the drive roller;
means extending along the entire length of the array of conveyor support frames from the receiving zone end to the discharge zone end and through at least one of the passageways extending through the elongate tubular members for supplying operating power to the drive motor; and
an endless conveyor belt mounted for movement around a course defined by the conveyor support rollers and the drive roller under the action of the drive motor for receiving material from the material delivery means of the first vehicle in the receiving zone, for conveying the material across the open area and for discharging the material in the discharge zone.

11. The aerial conveyor system according to claim 10 further characterized by:
a frame member supported on the cable at the discharge zone end of the array of conveyor support frames for supporting the drive roller and the drive motor; and
means securing the frame member against relative movement with respect to the cable.

12. The aerial conveyor system according to claim 10 wherein the second vehicle comprises a deadman and includes means for maintaining a predetermined tension in the cables.

13. The aerial conveyor system according to claim 10 wherein the first vehicle comprises excavating means.

14. An aerial conveyor system comprising:
a cable extending from a material receiving zone over an open area to a material discharge zone;
an endless conveyor belt supported substantially parallel to and beneath the cable for movement around a course from the receiving zone over the open area to the discharge zone;
means for maintaining a predetermined minimum tension in the cable;
a plurality of conveyor belt support rollers each positioned below and extending transversely with respect to the cable, the plurality of conveyor belt support rollers defining the course of the conveyor belt;
means for supporting each of the conveyor support belt rollers from the cable;
means for establishing a predetermined spaced apart relationship between the endmost conveyor belt support rollers;
the means for establishing a predetermined spaced apart relationship between the endmost conveyor belt support rollers having a predetermined maximum strength in the axial direction which is substantially less than the reactive force resulting from the tension developed in the conveyor belt by its entrainment around the end rollers and therefore being axially collapsible inwardly under the tension of the conveyor belt;
means for applying axially outwardly directed forces in response to cable tension to opposite ends of the means for establishing a predetermined spaced apart relationship between the endmost conveyor belt support rollers and thereby relieving the establishing means of any reactive compressive forces that would otherwise be applied to it by the tension in the belt and cause its collapse; and
drive means including one of the end rollers for driving the conveyor belt around the course defined by the support rollers.

15. The conveyor system of claim 14 further including:
means for securing a portion of the means for establishing the spaced apart relationship between the endmost conveyor belt support rollers for relative axial movement with respect to the remainder thereof whereby the distance between the endmost rollers is made variable; and
means operable in response to variations in loading on the endless conveyor belt for increasing the axial forces on the means for establishing a predetermined spaced apart relationship between the end conveyor belt support rollers as the loading on the conveyor belt increases, thereby increasing the tension on the conveyor belt as the loading in the conveyor belt increases.

16. The conveyor system of claim 14 further including:
means for sensing the variations in loading on the conveyor belt and for varying the tension on the belt as the loading varies, the tension varying means increasing the tension on the belt as the load on the belt increases and decreasing the tension on the belt as the load on the belt decreases.

17. The conveyor system of claim 16 wherein the traction between the end rollers and the belt is increased when the tension in the belt is increased in response to increased loading on the belt.

18. The aerial conveyor system according to claim 14 wherein the drive means is hydraulically operated, and wherein the operating power supplying means comprises means for supplying pressurized hydraulic fluid to the drive means.

19. The aerial conveyor system according to claim 14 further characterized by first and second vehicles connected to and supporting the opposite ends of the cable, whereby both the receiving zone end and the discharge zone end of the conveyor system are independently positionable.

20. The aerial conveyor system of claim 14 wherein the means for supporting each of the conveyor support belt rollers from the cable and the means for establishing a predetermined spaced apart relationship between the conveyor belt support rollers include:
  conveyor support frames each comprising a pair of elongate members extending substantially parallel to the cable, means for supporting the elongate members from the cable, and means for suspending a conveyor support belt roller between the elongate members, the elongate members engaging one another end to end to define a substantially continuous array extending from the receiving zone to the discharge zone, the array being axially collapsible inwardly.

21. The aerial conveyor system of claim 20 wherein the drive means includes:
  a drive roller mounted at the discharge zone end of the array of conveyor support frames;
  a drive motor mounted at the discharge zone end of the array of conveyor support frames for actuating the drive roller;
  means for supplying operating power to the drive motor.

22. The aerial conveyor system of claim 20 further including:
  coupling means securing the support roller at the discharge zone end of the conveyor belt to the cable to prevent relative movement therebetween;
  a lever mounted at the receiving zone and having upper and lower ends;
  means pivotally supporting the lever at a point intermediate the upper and lower ends;
  means connecting the cable to the upper end of the level; and
  means connecting the receiving zone ends of the elongate members to the lower end of the lever, the axially outwardly directed forces being directed through the lever supporting means and the coupling means to maintain the elongate means in tension, whereby the pivotal movement of the lever resulting from the movement of the belt and elongate member support means under the weight of material carried by the conveyor system varies the tension in the conveyor belt.

23. The aerial conveyor system of claim 22 further including:
  a first vehicle including the means for pivotally supporting the lever;
  a second vehicle supporting the coupling means securing the discharge zone end of the array of conveyor support frames to the cable; and
  means mounted on the second vehicle for maintaining a predetermined constant tension on the coupling means thereby maintaining the cable and the elongate members in tension notwithstanding relative movement of the first and second vehicles toward and away from each other.

24. An aerial conveyor system comprising:
  a cable extending from a material receiving zone over an open area to a material discharge zone;
  a plurality of conveyor belt support rollers defining a course from a material receiving zone over an open area to a material discharge zone;
  means for interconnecting the endmost conveyor belt support rollers;
  means securing a portion of the interconnecting means for relative axial movement with respect to the remainder thereof, permitting the distance between the endmost support rollers to be variable;
  means securing one endmost roller to the cable to prevent relative movement therebetween;
  an endless conveyor belt entrained around the endmost conveyor belt support rollers and adapted for movement around the course defined by the plurality of conveyor belt support rollers;
  means for supporting each of the conveyor belt support rollers from the cable whereby the weight of the material being carried by the conveyor belt is applied directly to the cable;
  drive means acting through one of the end rollers for driving the belt around the course;
  means for applying axially outwardly directed forces to opposite ends of the interconnecting means to tension the belt;
  the force applying means being connected to the cable to adjust the axially outwardly directed forces in response to variations in the load on the conveyor belt, the force applying means increasing the axially outwardly directed force as the load on the conveyor belt is increasing, and decreasing the axially outwardly directed force as the load on the conveyor belt is decreased thereby increasing the traction between the belt and the driven endmost roller.

25. The aerial conveyor system according to claim 24 wherein the drive means is hydraulically operated, and wherein the operating power supplying means comprises means for supplying pressurized hydraulic fluid to the drive means.

26. The aerial conveyor system according to claim 24 further characterized by first and second vehicles connected to and supporting the opposite ends of the means for normally maintaining a predetermined spaced apart relationship between the conveyor belt support rollers, whereby both the receiving zone end and the discharge zone end of the conveyor system are independently positionable.

27. The aerial conveyor system of claim 24 wherein the interconnecting means and the means for supporting the conveyor belt support rollers include:
  conveyor support frames each comprising a pair of elongate members and means for suspending a conveyor support belt roller between the elongate members, the pairs of elongate members engaging one another end to end to define a substantially continuous array extending from the receiving zone to the discharge zone, the array being axially collapsible inwardly.

28. The aerial conveyor system of claim 27 wherein the drive means includes:
  a drive motor mounted at the discharge zone end of the array of conveyor support frames for actuating the end roller at the discharge zone; and
  means for supplying operating power to the drive motor.

29. The aerial conveyor system of claim 27 wherein the means for applying the axially outwardly directed forces comprises:

a lever mounted at the receiving zone and having upper and lower ends;

means pivotally supporting the lever at a point intermediate between the upper and lower ends;

means connecting the cable to the upper end of the lever; and means connecting the receiving zone ends of the elongate members to the lower end of the lever, whereby the weight of the material being carried by the conveyor belt is transmitted by the cable to the lever as a force causing pivotal movement of the lever which varies the distance between the end rollers, with the tension on the conveyor belt being varied in proportion.

30. The aerial conveyor system of claim 27 further including:

a first vehicle including the means for supporting the receiving zone end of the array of conveyor support frames;

a second vehicle supporting the discharge zone end of the array of conveyor support frames; and means mounted on the second vehicle for maintaining a predetermined constant tension on the cable notwithstanding relative movement of the first and second vehicles toward and away from each other.

31. An aerial conveyor system comprising:

a cable extending from a material receiving zone over an open area to a material discharge zone;

an endless conveyor belt supported substantially parallel to and beneath the cable for movement around a course extending from the receiving zone over the open area to the discharge zone;

means for maintaining a predetermined minimum tension in the conveyor belt;

a plurality of conveyor belt support rollers each positioned below and extending transversely with respect to the cable, the plurality of conveyor belt support rollers defining the course of the conveyor belt;

a plurality of conveyor support frames for supporting each of the conveyor support belt rollers from the cable, each of the conveyor support frames comprising a pair of elongate members extending substantially parallel to the cable and means for supporting the elongate members from the cable;

the elongate members engaging one another end to end to define a substantially continuous array extending from the receiving zone to the discharge zone, the array having a predetermined maximum strength in the axial direction which is substantially less than the reactive force resulting from the predetermined minimum tension in the conveyor belt and therefore being axially collapsible inwardly;

means for applying axially outwardly directed forces to opposite ends of the means for normally maintaining a predetermined spaced apart relationship between the conveyor belt support rollers, the force applying means including (a) coupling means securing the discharge zone end of the array of conveyor support frames to the cable to prevent relative movement therebetween;

(b) means securing a portion of the array of conveyor support frames for relative axial movement with respect to the remainder thereof whereby the distance between the receiving zone end and the discharge zone end of the array is variable;

(c) a lever mounted at the receiving zone and having upper and lower ends;

(d) means pivotally supporting the lever at a point intermediate between the upper and lower ends;

(e) means connecting the cable to the upper end of the lever; and (f) means connecting the receiving zone ends of the elongate members of the conveyor support frames to the lower end of the lever, the means for applying axially outwardly directed forces being directed to the lever supporting means and the coupling means to maintain the elongate means in tension, whereby the pivotal movement of the lever resulting from the movement of the belt and elongate member support means under the weight of material carried by the conveyor system varies the tension in the conveyor belt; and drive means for driving the conveyor belt around the course.

32. The aerial conveyor system of claim 31 further including:

a first vehicle including the means for pivotally supporting the lever;

a second vehicle supporting the coupling means securing the discharge zone end of the array of conveyor support frames to the cable; and means mounted on the second vehicle for maintaining a predetermined constant tension on the coupling means thereby maintaining the cable and the elongate members in tension notwithstanding relative movement of the first and second vehicles toward and away from each other.

33. An aerial conveyor system comprising:

a cable extending from a material receiving zone over an open area to a material discharge zone;

a plurality of conveyor belt support rollers each positioned below and extending transversely with respect to the cable;

means for supporting each of the conveyor support rollers from the cable, the plurality of conveyor belt support rollers supported to define a course from the material receiving zone to the material discharge zone;

means for normally maintaining a predetermined spaced apart relationship between the conveyor belt support rollers;

an endless conveyor belt supported substantially parallel to and beneath the cable for movement around the course defined by the plurality of conveyor belt support rollers;

means for maintaining a predetermined minimum tension in the conveyor belt;

the means for normally maintaining a predetermined spaced apart relationship between the conveyor belt support rollers comprising an array of tube members, the tube members being engaged end to end with means for permitting axial movement of the receiving zone end of the conveyor belt relative to the discharge end of the conveyor belt thereby providing for tensioning of the belt, having a predetermined maximum strength in the axial direction which is substantially less than the reactive force resulting from the predetermined minimum tension in the conveyor belt and therefore axially collapsible;

means for applying axially outwardly directed forced on opposite ends of the means for normally maintaining a predetermined spaced apart relationship between the conveyor belt support rollers and for applying axially outwardly directed forces on said dable extending from the material receiving zone to the material discharge zone;

means for adjusting the axially outwardly directed force means in relation to the load on the conveyor belt, the adjusting means increasing the axially outwardly directed forces as the load on the conveyor belt is increasing and decreasing the axially outwardly directed force as the load on the conveyor belt is decreased;

drive means for driving the conveyor belt around the course;

the conveyor drive means comprising a drive roller mounted at the discharge zone end of the array of conveyor belt support rollers and defining the discharge zone end of the course of the conveyor, a drive motor for actuating the drive roller to move the endless conveyor belt around the course, and means for supplying operating power to the drive motor, with the traction between the drive roller and the belt being increased as the force adjusting means increases the outwardly directed force in response to increased loading on the belt;

coupling means securing the discharge zone end of the array of tube members to said cable to prevent relative movement therebetween;

a lever mounted adjacent the receiving zone end of the conveyor belt and having upper and lower ends;

means pivotally supporting the lever at a point intermediate between the upper and lower ends;

means connecting the cable to the upper end of the lever; and means connecting the receiving zone ends of the tube members to the lower end of the lever, the means for applying axially outwardly directed forces being directed to the lever supporting means and the coupling means to maintain the tube members in tension, whereby the pivotal movement of the lever, resulting from the movement of the belt and conveyor roller support means under the weight of material carried by the conveyor system varies the tension in the conveyor belt.

34. The aerial conveyor system of claim 33 further including:

a first vehicle including the means for pivotally supporting the lever;

a second vehicle supporting the coupling means securing the discharge zone end of the array of tube members to the cable; and means mounted on the second vehicle for maintaining a predetermined constant tension on the coupling means thereby maintaining the cable and the tube members in tension notwithstanding relative movement of the first and second vehicles toward and away from each other.

35. The aerial conveyor system according to claim 34 wherein the first vehicle includes excavating means and material delivery means for receiving material from the excavating means and for delivering the material to the endless conveyor belt.

36. An aerial conveyor system comprising:

a cable extending from a material receiving zone over an open area to a material discharge zone;

an endless conveyor belt supported substantially parallel to and beneath the cable for movement around a course extending from the receiving zone over the open area to the discharge zone;

a plurality of conveyor belt support rollers each positioned below and extending transversely with respect to the cable, the plurality of conveyor belt support rollers defining the course of the conveyor belt;

conveyor support frames depending from the cable for supporting each of the conveyor belt support rollers;

means defining a substantially continuous, axially collapsible array extending from the receiving zone to the discharge zone for maintaining a spaced apart relationship between the conveyor belt support rollers;

coupling means securing the discharge zone end of the array to the cable to prevent relative movement therebetween;

a lever mounted adjacent the receiving zone end of the conveyor belt and having upper and lower ends;

means pivotally supporting the lever at a point intermediate between the upper and lower ends;

means connecting the cable to the upper end of the lever;

means connecting the receiving zone end of the array to the lower end of the lever;

means coupled to the lever pivotal support means for applying through the lever and the coupling means axially outwardly directed forces to maintain the conveyor belt in tension and thereby relieve the array of any reactive compressive forces that would collapse the array.

37. The aerial conveyor system of claim 36 wherein each conveyor belt support frame comprises a pair of tubes extending below and parallel to the cable, frame members extending upwardly from each tube, a beam interconnecting the tubes, and a plurality of conveyor support rollers mounted on the beam.

* * * * *